(12) United States Patent
Candelore

(10) Patent No.: US 10,104,111 B2
(45) Date of Patent: Oct. 16, 2018

(54) NETWORK SECURITY FOR INTERNET OF THINGS

(71) Applicant: SONY CORPORATION, Tokyo (JP)

(72) Inventor: Brant Candelore, Escondido, CA (US)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 15/045,463

(22) Filed: Feb. 17, 2016

(65) Prior Publication Data

US 2017/0237763 A1 Aug. 17, 2017

(51) Int. Cl.
*H04L 29/06* (2006.01)
*H04L 12/46* (2006.01)

(52) U.S. Cl.
CPC ...... *H04L 63/1433* (2013.01); *H04L 12/4625* (2013.01); *H04L 12/4633* (2013.01); *H04L 63/0236* (2013.01); *H04L 63/1441* (2013.01)

(58) Field of Classification Search
CPC ............ H04L 63/1433; H04L 63/1441; H04L 63/0236; H04L 12/4633; H04L 12/4625
See application file for complete search history.

(56) References Cited

U.S. PATENT DOCUMENTS

| | | | | |
|---|---|---|---|---|
| 8,571,222 B1* | 10/2013 | Perry | .................... | H04W 12/06 380/270 |
| 9,154,378 B2 | 10/2015 | Haddad et al. | | |
| 9,351,136 B1* | 5/2016 | Nautiyal | ................. | H04W 4/14 |
| 2005/0063333 A1* | 3/2005 | Patron | .................... | H04L 63/08 370/329 |
| 2007/0140255 A1* | 6/2007 | Gautier | ................. | H04W 88/06 370/395.5 |
| 2007/0249372 A1* | 10/2007 | Gao | ....................... | H04L 51/14 455/466 |
| 2008/0126550 A1* | 5/2008 | Yasuma | .............. | G06F 17/3089 709/229 |
| 2008/0250478 A1 | 10/2008 | Miller et al. | | |
| 2012/0236796 A1* | 9/2012 | Lazaridis | .......... | H04L 29/12301 370/328 |
| 2012/0254960 A1* | 10/2012 | Lortz | .................... | H04L 63/104 726/7 |
| 2013/0094444 A1* | 4/2013 | Lai | ........................ | H04W 8/265 370/328 |
| 2013/0333016 A1* | 12/2013 | Coughlin | .............. | H04W 12/06 726/9 |

(Continued)

FOREIGN PATENT DOCUMENTS

JP 2008159024 A 7/2008

OTHER PUBLICATIONS

Anonymous, "Configure a guest WLAN [OpenWrt Wiki]", Oct. 18, 2015, pp. 1-6, retrieved on Apr. 11, 2017 from http://www.gnucitizen.org/blog/hacking-with-upnp-universal-plug-and-play/.

(Continued)

Primary Examiner — Joseph P Hirl
Assistant Examiner — J. Brant Murphy
(74) Attorney, Agent, or Firm — John L. Rogitz

(57) ABSTRACT

Two wireless networks are established in a local network, one for less-secure IoT devices and one for more-secure conventionally networked devices, with a bridge establishing connectivity between the two networks. Message exchange between the two networks is tailored to reduce the risk of a security breach in the network with the less-secure IoT devices infecting the network with more-secure devices.

13 Claims, 4 Drawing Sheets

(56) References Cited

U.S. PATENT DOCUMENTS

| | | | | |
|---|---|---|---|---|
| 2014/0073365 A1* | 3/2014 | Goyal | H04W 4/14 | 455/458 |
| 2014/0244710 A1* | 8/2014 | Sharma | H04L 67/12 | 709/201 |
| 2014/0250204 A1* | 9/2014 | Shalunov | H04L 67/02 | 709/217 |
| 2014/0254799 A1* | 9/2014 | Husted | H04L 63/068 | 380/270 |
| 2014/0331144 A1* | 11/2014 | Kim | G06F 3/0482 | 715/739 |
| 2015/0006296 A1* | 1/2015 | Gupta | G06Q 30/0269 | 705/14.66 |
| 2015/0095933 A1* | 4/2015 | Blackburn | H04M 7/0078 | 725/25 |
| 2015/0139042 A1 | 5/2015 | Connelly et al. | | |
| 2015/0207802 A1* | 7/2015 | Balasubramaniam | H04L 63/08 | 726/30 |
| 2015/0381662 A1 | 12/2015 | Nair et al. | | |
| 2016/0006696 A1 | 1/2016 | Donley et al. | | |
| 2016/0100035 A1* | 4/2016 | Martis | H04L 67/34 | 709/203 |
| 2016/0173495 A1* | 6/2016 | Joo | H04L 63/08 | 713/171 |
| 2016/0197934 A1* | 7/2016 | Muraoka | H04L 63/104 | 726/7 |
| 2016/0226707 A1* | 8/2016 | Schallich | H04L 41/0806 | |
| 2016/0227371 A1* | 8/2016 | Wang | H04W 4/005 | |
| 2016/0234628 A1* | 8/2016 | Rahman | H04L 12/2809 | |
| 2016/0294828 A1* | 10/2016 | Zakaria | H04L 41/0886 | |
| 2017/0171143 A1* | 6/2017 | Ge | H04L 51/36 | |

OTHER PUBLICATIONS

Anonymous: "Routed Client with relayd (Pseudobridge) [OpenWrt Wiki]", Nov. 27, 2015, pp. 1-7, Retrieved on Apr. 10, 2017 from https://web-beta.archive.org/web/20151128143551/https://wiki.openwrt.org/doc/recipes/relayclient.

Petko D. Petkov, "Hacking with UPnP (Universal Plug and Play)", Jan. 10, 2008, pp. 1-8, Retrieved on Apr. 11, 2017 from http://www.gnucitizen.org/blog/hacking-with-upnp-universal-plug-and-play/.

* cited by examiner

NETWORK SECURITY FOR INTERNET OF THINGS

FIELD

The application relates generally to network security for Internet of Things (IoT) devices.

BACKGROUND

The "Internet of Things" (IoT) refers to the growing interconnectedness of apparatuses on a network that heretofore have not been computerized or placed on networks. Examples of such apparatuses that may now be computerized and accorded network communication capability include home appliances such as refrigerators, motor vehicles, baby monitors, skateboards, firearms, light bulbs, thermostats, etc.

SUMMARY

As understood herein, IoT devices, unlike conventionally networked devices such as personal computers (PCs), tablet computers, smart phones, and audio video display devices such as TVs, tends to have lower security capability owing to a number of factors including the lack of consistent software updates. As also understood herein, such vulnerability can infect otherwise more secure computing devices. As a consequence, government recommendations tend toward the unrealistically constraints, such as limiting the manufacturers from whom IoT devices are purchased, limiting automated network discovery in a home network, purchasing updated new devices and abandoning older but functional devices, enforcing frequent password changes, etc. These recommendations do not account for their nuisance factor and the concomitant implausibility of being adopted.

When IoT devices work as intended, they can make our lives easier, and can save us money by being more frugal with power and water. And thus, it would be desirable to allow IoT devices to exist in the home and be able to control them using control devices such a PCs and tablets, but mitigate the security consequences should a device get hacked. In fact, it might be assumed that the IoT devices will get hacked.

Accordingly, an apparatus includes at least one computer memory that is not a transitory signal and that comprises instructions executable by at least one processor to establish communication with a first wireless local area network. The instructions are also executable to establish communication with a second wireless local area network. The first and second local area wireless networks do not communicate with each other except through the apparatus. The apparatus may also have a connection to a wide area network (WAN) and the Internet. The instructions are executable to prevent a first type of message from the first wireless network and addressed to the second wireless network and/or one or more devices communicating over the second wireless network from being passed to the second wireless network. The instructions are further executable to permit a second type of message from the first wireless network and addressed to the second wireless network and/or one or more devices communicating over the second wireless network to be passed to the second wireless network. Still further, the instructions are executable to prevent a third type of message from the second wireless network and addressed to the first wireless network and/or one or more devices communicating over the first wireless network from being passed to the first wireless network. Also, the instructions are executable to permit a fourth type of message from the second wireless network and addressed to the first wireless network and/or one or more devices communicating over the first wireless network to be passed to the first wireless network.

In examples, the apparatus can include the processor and can also include a first network interface configured for communicating with the first wireless network and a second network interface configured for communicating with the second wireless network.

In some implementations, the first wireless network communicates with first devices and is characterized by a first security, whereas the second wireless network communicates with second devices and is characterized by a second security. The first security is higher than the second security.

In example embodiments, the first and fourth type of message may include a simple service discovery protocol (SSDP) presence message. On the other hand, the second and third type of message may include a request for information embodied in simple object access protocol (SOAP) request.

In another aspect, an apparatus includes at least one computer memory that is not a transitory signal and that includes instructions executable by at least one processor to establish communication with a first wireless network. The instructions are also executable to establish communication with a second wireless network. The first and second wireless networks do not communicate with each other except through the apparatus. The insinuations are executable to execute at least one of the following:

prevent first messages from the first wireless network and addressed to the second wireless network and/or one or more devices communicating over the second wireless network from being passed to the second wireless network; or permit second messages from the first wireless network and addressed to the second wireless network and/or one or more devices communicating over the second wireless network to be passed to the second wireless network; or prevent third messages from the second wireless network and addressed to the first wireless network and/or one or more devices communicating over the first wireless network from being passed to the first wireless network; or permit fourth messages from the second wireless network and addressed to the first wireless network, and/or one or more devices communicating over the first wireless network to be passed to the first wireless network.

In another aspect, a method includes establishing communication between relatively secure computerized devices on a first network, and establishing communication between relatively non-secure Internet of Things (IoT) devices on a second network different from the first network. The method contemplates blocking presence messages from devices on the first network from reaching devices on the second network and permitting requests for information from devices on the first network to reach devices on the second network. On the other hand, the method includes passing presence messages from devices on the second network to devices on the first network and blocking requests for information from devices on the second network from reaching devices on the first network. In this way, it makes it difficult for hacked IoT devices to explore the complete home network, comprising the two wireless local area networks, in order to search for devices to monitor, attack or compromise.

The details of the present application, both as to its structure and operation, can best be understood in reference to the accompanying drawings, in which like reference numerals refer to like parts, and in which:

DETAILED DESCRIPTION

Figure 1:
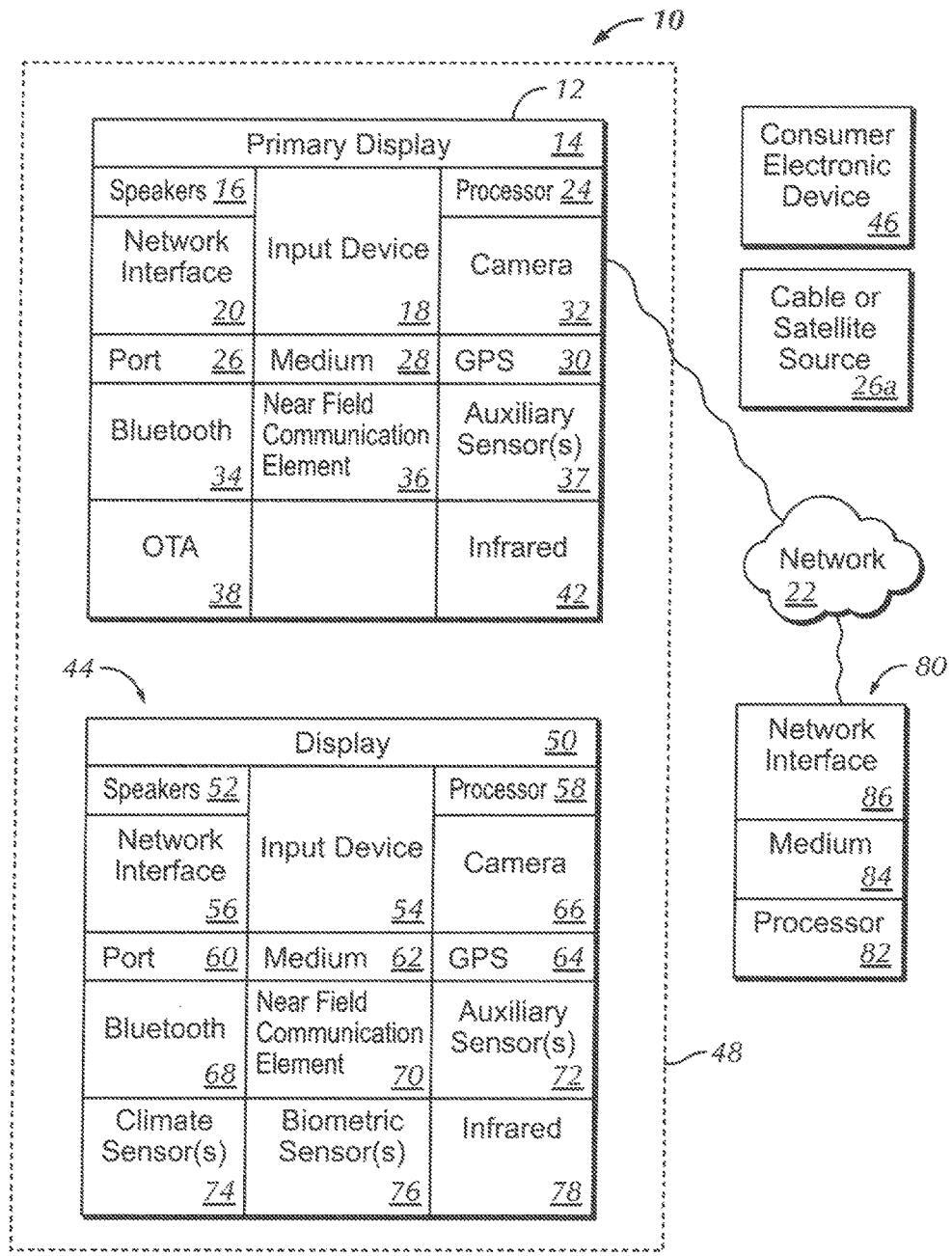
FIG. 1 is a block diagram of an example system including an example in accordance with present principles.

This disclosure relates generally to computer ecosystems including aspects of computer networks that may include consumer electronics (CE) devices. A system herein may include server and client components, connected over a network such that data may be exchanged between the client and server components. The client components may include one of more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, as example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly so a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, It is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more displays 50 that may be touch-enabled, for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more vehicle processors 58 such as an engine control module (ECM). Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery such as a vehicle batter (not shown) may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
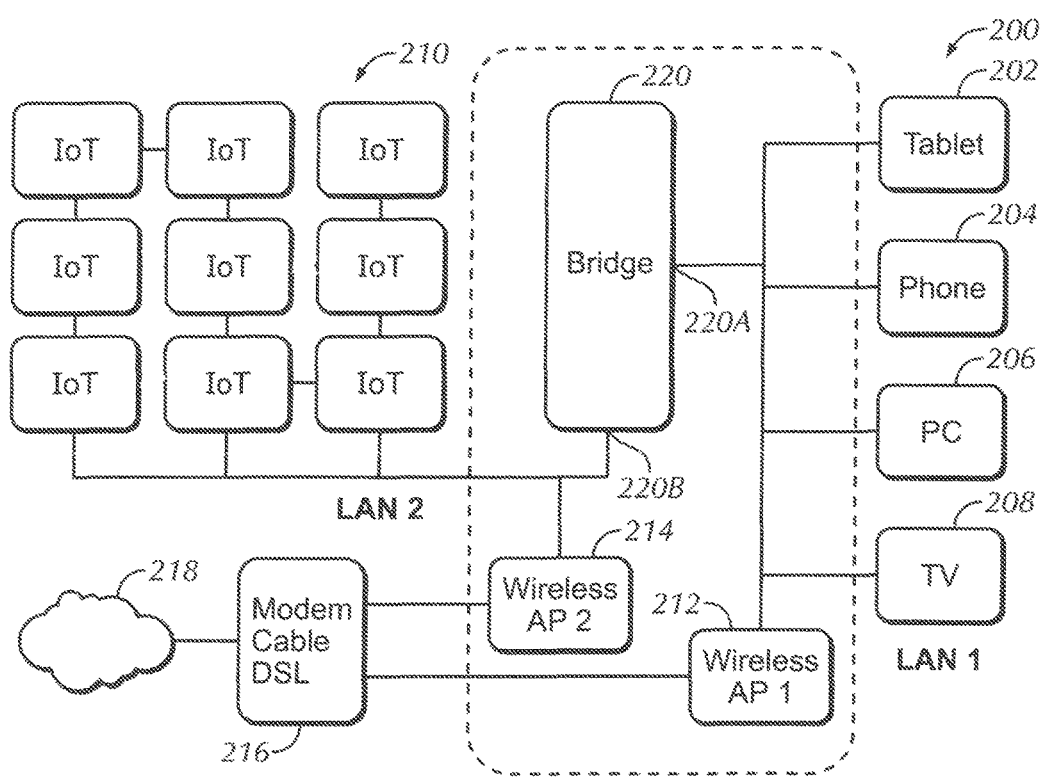
FIG. 2 is a schematic diagram of an example IoT network implemented in a home network.

FIG. 2 shows a dual network implementation of two types of devices each of which devices may include appropriately selected components of the devices 12, 44, 46 described above in reference to FIG. 1. In FIG. 2, a first group of one or more computer-centric devices 200 is shown and may include a tablet computer 202, a smart phone 204, a personal computer 206, and a video display device such as a TV 208. These devices 200 may all communicate with a first wireless local area network (LAN 1) as shown, with the LAN 1 being, for example, a LAN in a dwelling or office building or commercial office or other building.

As also shown in FIG. 2, a second group of one or more devices 210 may be present. Each device in FIG. 2 in the second group 210 is labeled "IoT" to signify it is a device that conventionally has not been computer-centric, such as but not limited to baby monitors, firearms, home appliances such as refrigerators, skateboards, motor vehicles, light bulbs, thermostats, etc. and that owing to the emergence of IoT technology may include respective processors and wireless transceivers for communicating over a second LAN (LAN 2) as shown.

Recognizing that the IoT devices 210 communicating over LAN 2 may be inherently less secure than the devices 200 communicating over LAN 1, the two LANs are different from each other. In one implementation, LAN 1 uses a first frequency or frequency band and LAN 2 uses a second frequency or frequency band different from the first. Indeed, in some non-limiting examples the two LANs may use different protocols from each other. For example, the first LAN 1 can be a Wifi LAN while the second LAN 2 can be a Bluetooth LAN or a ZigBee LAN.

Typically, the first LAN 1 employs a first computerized wireless access point (AP) 212 while the second LAN 2 employs a second computerized wireless AP 214. Both Aps 212, 214 may communicate through a network interface such as but not limited to a cable or direct subscriber line (DSL) modem 216 with the Internet 218 and, hence, with the cloud server 80 shown in FIG. 1 and other servers.

In the example shown in FIG. 2, the two LANs 1, 2 do not communicate with each other except through a computerized bridge 220. The bridge 220, like the other devices in FIG. 2 including the APs 212, 214, can include its own respective processor or processors, computer memories, internal computer busses, and in the embodiment of FIG. 2 respective first and second network interfaces 220A, 220B for communicating with the first and second LANs 1, 2. The network interfaces in the bridge 200 are configured as appropriate for communicating with both LANs 1, 2. In the example shown, the bridge 220 and APs 212, 214 are all contained in a single device housing 222. In other examples, two of three of the bridge 220 and APs 212, 214 are contained in the device housing 222 and the third of the three is contained in a device separate from the housing 222. In another example, all three of the bridge 220 and APs 212, 214 are contained in respective devices or housing different from each other. In some embodiments, the bridge 220 may be implemented in the cloud server 80. In other embodiments, the bridge 220 may be implemented in one of the devices 200 in the first group or less preferably one of the devices 210 in the second group.

It should be noted that each LAN uses separate security. The devices assigned to one LAN are not configured with and consequently do not have the security credentials, e.g. password or certificate, to access the other LAN. Consequently, a misbehaving IoT device, e.g. one that has been hacked, cannot manage the security of the other LAN even if it can manage the frequency and wireless technology.

Figure 3:
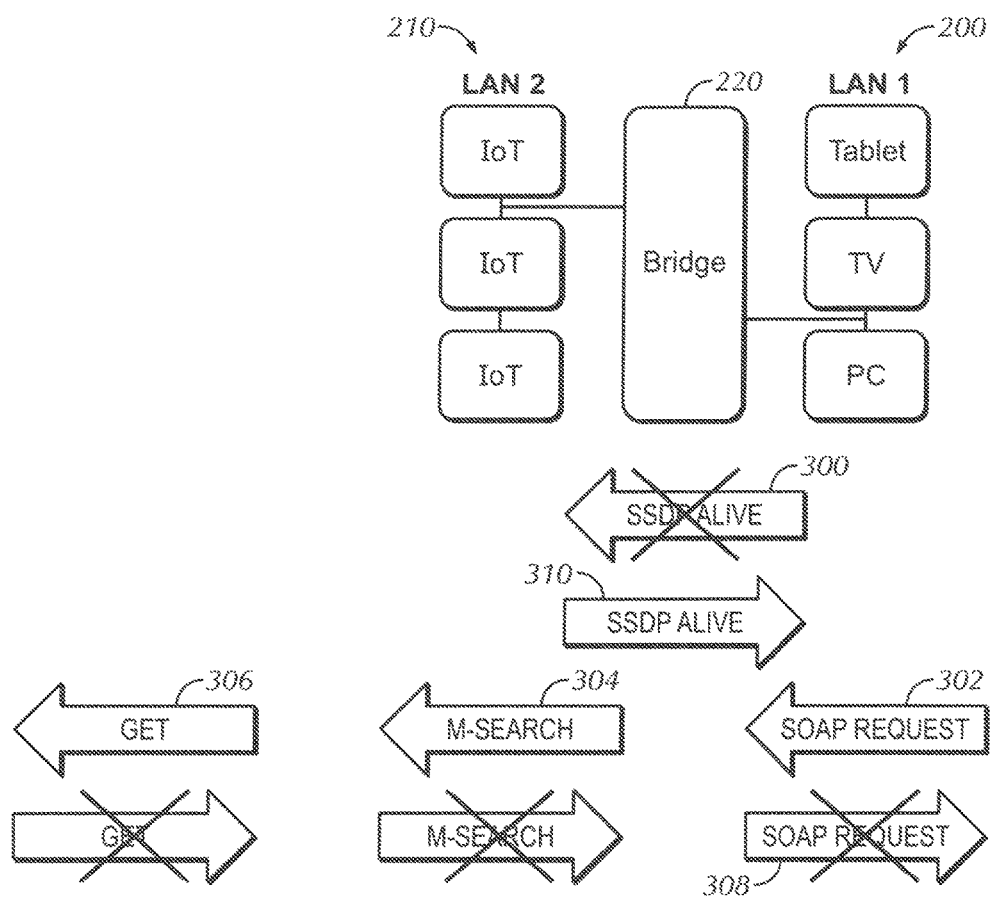
FIG. 3 is a schematic diagram of an example IoT network implemented in a home network, schematically illustrating message handling.
Figure 4:
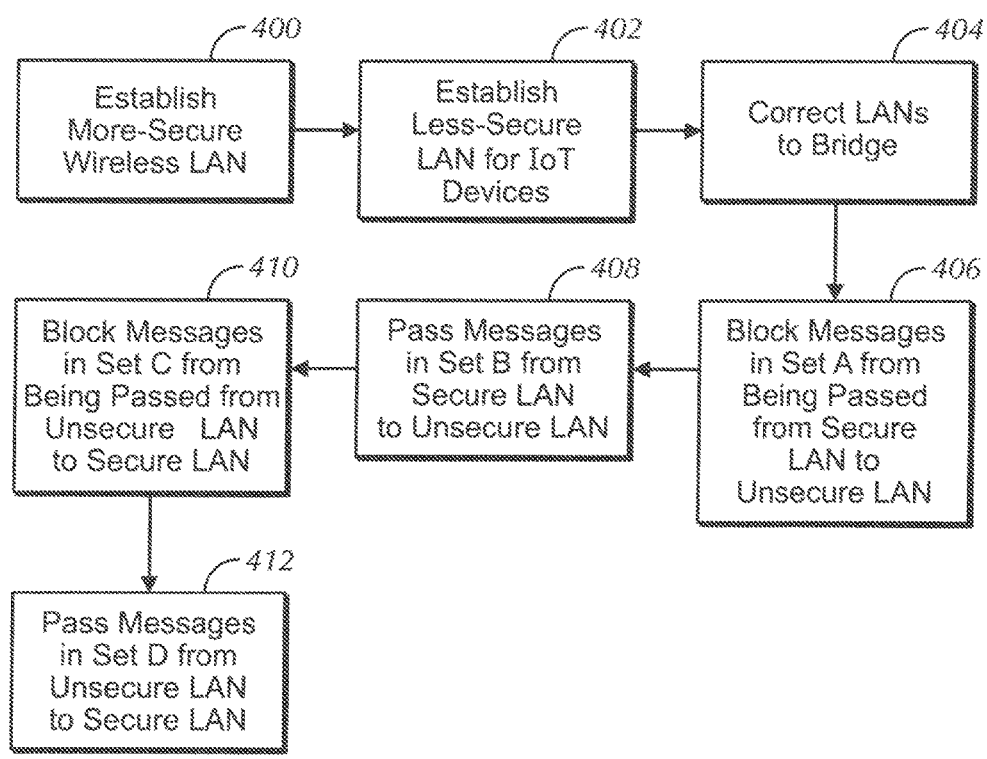
FIG. 4 is a flow chart of example logic.

FIG. 3 is a simplified version of FIG. 2 and in cross-reference to FIG. 4 illustrates that the bridge 220 passes certain types of messages between the LANs 1, 2 and blocks other types of messages, to reduce the risk that hacks of the relatively non-secure IoT LAN 2 can contaminate the relatively more secure devices on the first LAN 1. Block 400 in FIG. 4 indicates that the more-secure LAN 1 is established, block 402 indicates that the relatively less-secure non-secure LAN 2 is established, and the LANs are communicatively connected to the bridge 200 at block 404. It should be noted that neither LAN is inherently less secure. It is just that one LAN is assigned to handle IoT devices. If one of those devices gets hacked, then other devices on that LAN would be susceptible to attack, but not the other LAN which does not have those devices.

As indicated at 300 in FIG. 3 and at block 406 in FIG. 4, presence messages such as may be embodied in some example embodiments as simple service discovery protocol (SSDP) "alive" messages (implemented in, e.g., universal plug-n-play (UPnP)) that originate from any of the devices 200 in the more-secure LAN 1 are blocked by the bridge 200 from reaching the relatively non-secure LAN 2 and/or devices 210 thereon.

On the other hand, as shown at 302 in FIG. 3 and as indicated at block 408 in FIG. 4, requests for information such as may be embodied, in some example implementations, in simple object access protocol (SOAP) requests that originate from any of the devices 200 in the more-secure LAN 1 are passed by the bridge 200 to the relatively non-secure LAN 2 and/or devices 210 thereon. Along with SOAP requests, M-search messages 304 and GET requests 306 are passed to the device 210 on the less-secure LAN 2 to which the request is addressed.

In contrast, as shown at 308 in FIG. 3 and as indicated at block 410 in FIG. 4, requests for information such as may be embodied, in some example implementations, in SOAP requests that originate from any of the devices 210 in the less-secure LAN 2 are blocked by the bridge 200 from the relatively secure LAN 1 and/or devices 200 thereon. Similarly, M-search messages and GET requests from devices on LAN 2 may be blocked by the bridge 200 from reaching the LAN 1. However, as indicated at 310 in FIG. 3 and at block 412 in FIG. 4, presence messages such as may be embodied in SSDP "alive" messages that originate from any of the devices 210 in the less-secure LAN 2 are passed by the bridge 200 to the relatively more-secure LAN 1 and/or devices 200 thereon.

The bridge 200 may present a hypertext markup language (HTML) 5 user interface on a display of one or more of the devices herein to enable LAN set up and operation if desired. The bridge 200 may perform as a proxy to the devices 210 on the LAN 2 particularly if for instance, LAN 2 uses a non-compatible protocol such as Zigbee, in which case the bridge 200 handles digital living network alliance (DLNA) and UPnP responses for devices 210 on the LAN 2.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. An apparatus comprising:
   at least one computer memory that is not a transitory signal and that comprises instructions executable by at least one processor to:
   establish communication with a first wireless network;
   establish communication with a second wireless network;
   receive a first message of a first type of message from the first wireless network addressed to the second wireless network and/or one or more devices communicating on the second wireless network, the first type of message comprising a presence message;
   responsive to identifying the first message as being of the first type of message, prevent the first message from being passed to a device on the second wireless network;
   receive a second message of a second type of message from the first wireless network addressed to the second wireless network and/or one or more devices communicating on the second wireless network, the second type of message comprising a request for information;
   responsive to identifying the second message as being of the second type of message, permit the second message to be passed to the second wireless network;
   responsive to identifying a third message received from the second wireless network and addressed to the first wireless network and/or a device thereon as being of the second type of message, prevent the third message from being passed to the first wireless network; and
   responsive to identifying a fourth message received from the second wireless network and addressed to the first wireless network and/or a device thereon as being of the first type of message, permit the fourth message to be passed to the first wireless network.

2. The apparatus of claim 1, comprising the at least one processor.

3. The apparatus of claim 1, comprising a first network interface configured for communicating with the first wireless network and a second network interface configured for communicating with the second wireless network.

4. The apparatus of claim 1, wherein the first wireless network communicates with first devices and is characterized by a first security and the second wireless network communicates with second devices and is characterized by a second security, the first devices and second devices not sharing respective security credentials.

5. The apparatus of claim 1, wherein the first type of message includes a simple service discovery protocol (SSDP) presence message.

6. The apparatus of claim 5, comprising devices communicating over the first and second wireless networks.

7. The apparatus of claim 1, wherein the second type of message includes a request for information embodied in simple object access protocol (SOAP) request.

8. The apparatus of claim 1, comprising the first and second wireless networks.

9. An apparatus comprising:
   at least one computer memory that is not a transitory signal and that comprises instructions executable by at least one processor to:
   establish communication with a first wireless network:
   establish communication with a second wireless network, the first and second wireless networks not communicating with each other except through the apparatus;
   execute at least two of the following:
   prevent first messages from the first wireless network and addressed to the second wireless network and/or one or more devices communicating over the second wireless network from being passed to the second wireless network responsive to identifying that the first messages are of a first message type;
   permit second messages from the first wireless network and addressed to the second wireless network and/or one or more devices communicating over the second wireless network to be passed to the second wireless network responsive to identifying that the second messages are of a second message type;
   prevent second messages from the second wireless network and addressed to the first wireless network and/or one or more devices communicating over the first wireless network from being passed to the first wireless network responsive to identifying that the second messages are of the second message type;

permit first messages from the second wireless network and addressed to the first wireless network and/or one or more devices communicating over the first wireless network to be passed to the first wireless network responsive to identifying that the first messages are of the first message type, wherein the first message type includes presence messages and the second message type includes requests for information.

10. The apparatus of claim 9, wherein the instructions are executable to:

prevent first messages from the first wireless network and addressed to the second wireless network and/or one or more devices communicating over the second wireless network from being passed to the second wireless network.

11. The apparatus of claim 9, wherein the instructions are executable to:

permit second messages from the first wireless network and addressed to the second wireless network and/or one or more devices communicating over the second wireless network to be passed to the second wireless network.

12. The apparatus of claim 9, wherein the instructions are executable to:

prevent second messages from the second wireless network and addressed to the first wireless network and/or one or more devices communicating over the first wireless network from being passed to the first wireless network.

13. The apparatus of claim 9, wherein the instructions are executable to:

permit first messages from the second wireless network and addressed to the first wireless network and/or one or more devices communicating over the first wireless network to be passed to the first wireless network.

* * * * *